United States Patent

Ohanian

[11] Patent Number: 5,826,589
[45] Date of Patent: Oct. 27, 1998

[54] ASH RECEPTACLE FOR A GOLF CART

[76] Inventor: Varoujan Ohanian, 15110 Philip Lee Rd., Chantilly, Va. 20151

[21] Appl. No.: 851,096

[22] Filed: May 5, 1997

[51] Int. Cl.$^6$ ...................................................... A24F 19/02
[52] U.S. Cl. ........................... 131/242; 131/231; 131/236
[58] Field of Search .................................... 131/231, 242, 131/236; 296/379

[56] References Cited

U.S. PATENT DOCUMENTS

| | | | |
|---|---|---|---|
| 1,505,396 | 8/1924 | Lees | 131/236 |
| 2,494,629 | 10/1950 | Randel | 131/236 |
| 2,788,911 | 4/1957 | Mellon | 131/236 |
| 2,958,426 | 1/1960 | Dupree, Jr. | 131/236 |
| 3,394,712 | 7/1968 | Herr, et al. | 131/236 |
| 4,027,683 | 6/1977 | Lawbaugh | 131/236 |
| 5,379,787 | 1/1995 | Haines | 131/242 |

*Primary Examiner*—John G. Weiss
*Assistant Examiner*—Charles W. Anderson
*Attorney, Agent, or Firm*—Terrance L. Siemens

[57] ABSTRACT

The present invention features an ash receptacle for attaching to a vertical surface of the body of a golf cart or similar vehicle. A tiltable cover keeps rain from entering the ash collection chamber which features a removable insert for ease of dumping. Clips are provide for securely holding one or more lighted cigarettes. Drainage holes are provided in the bottom of the outer body to allow drainage of trapped rain water, condensation, or the like. All outer edges and corners of the ash receptacle are rounded to prevent snagging a user's clothing or injuring a user in the event that the user accidentally brushes against or bumps the ash receptacle.

14 Claims, 2 Drawing Sheets

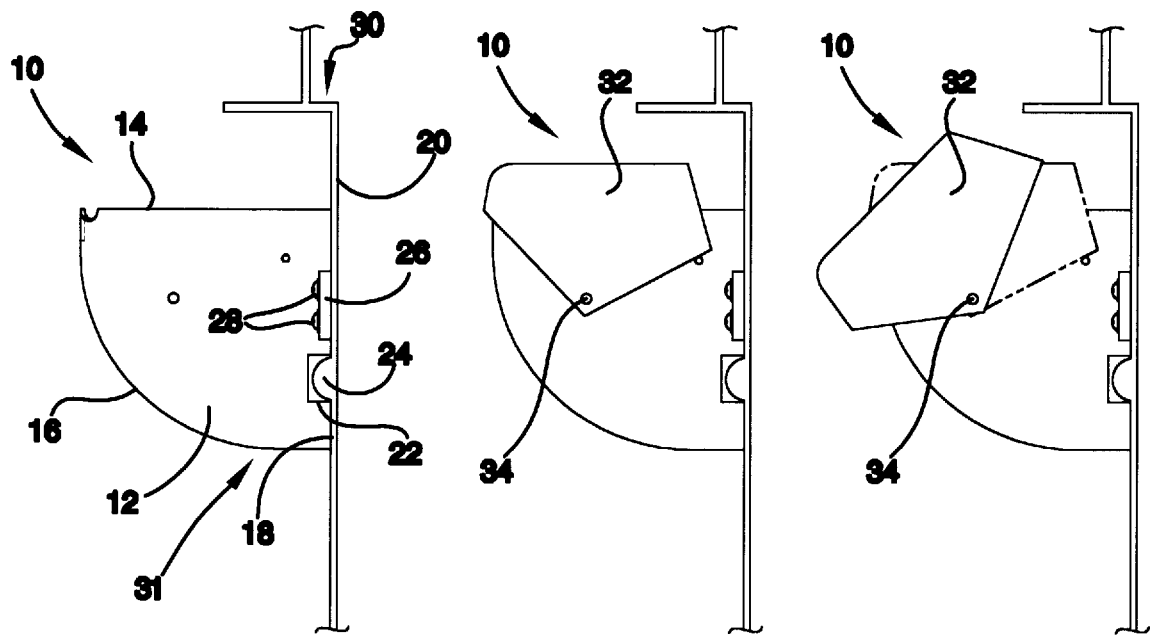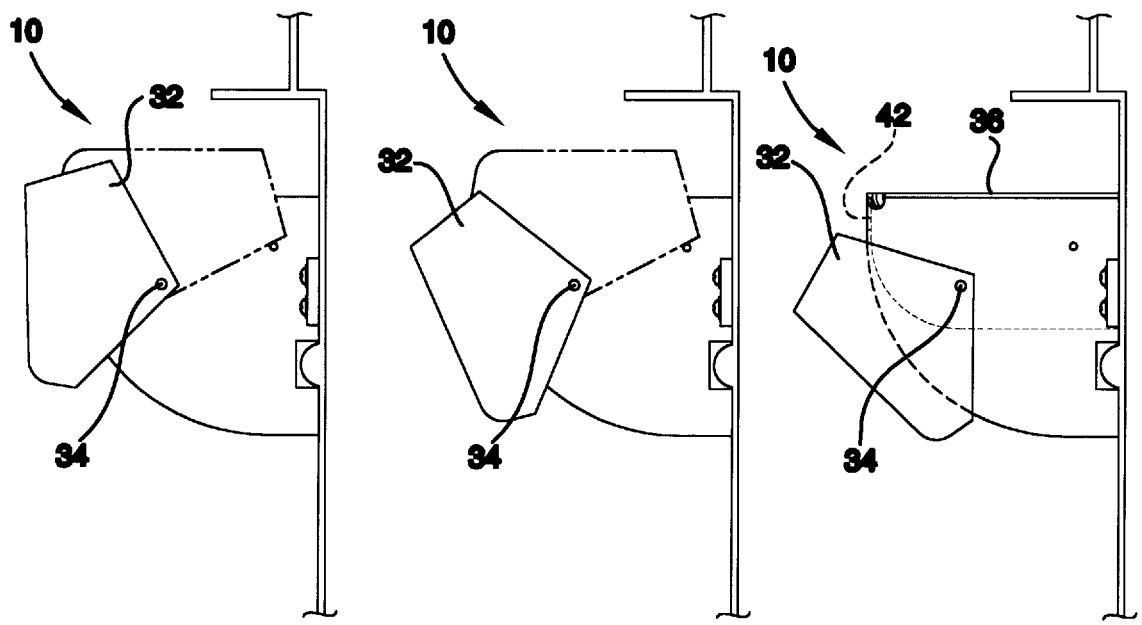

ASH RECEPTACLE FOR A GOLF CART

FIELD OF THE INVENTION

The present invention relates to a receptacle for receiving cigarette ashes or the like and, more particularly, to a covered, weather-proof ash receptacle for attachment to a motorized golf cart or similar recreational vehicle.

BACKGROUND OF THE INVENTION

The proper disposal of cigar or cigarette ashes or butts is always a problem for the smoker. Under many circumstances, receptacles for disposal are conveniently located. However, when on the golf course, such receptacles never seem to be within easy reach. The temptation is, therefore, to drop the ashes and or butts on the ground where the smoker is standing at the moment. This produces extra work for the grounds keeping staff, creates an unsightly mess and more importantly, these acts depreciate the environment for years to come. With smoker's rights so hotly contested, it becomes expeditious for smokers to make as good an impression as possible by not leaving evidence of their habit.

Ash receptacles intended for outdoor use have special requirements. Because of the mess presented by wet ashes and butts, any such receptacle should provide a way to keep rain or other precipitation from entering the ash storage chamber. This necessitates a covered structure which is still convenient for the smoker to use. In addition, the ash receptacle should be easy to empty and maintenance free.

DISCUSSION OF THE PRIOR ART

The problem of ash disposal for smokers away from locations having ash disposal facilities has previously been approached in a number of different ways. U.S. Pat. No. 2,958,426 for ASH RECEPTACLE AND MOUNTING MEANS; issued Nov. 1, 1960 to Samuel F. Dupree, Jr. discloses a portable ash receptacle for attachment to an upholstered object such as an automobile seat cushion. A tiltable cover is provided to keep the ashes from spilling. Cigarette-gripping holders are also provided. The ash receptacle must be removed from its mounting for emptying. Unlike the Dupree ash receptacle, the ash receptacle of the instant invention features an easily removable insert which holds the ashes and butts and is easily lifted out for emptying. In addition, the inventive ash receptacle is weather-proof and is adapted for semi-permanent mounting on a vertical surface, not an upholstered seat cushion.

Another approach to ash disposal is taught in U.S. Pat. No. 3,394,712 for ASH RECEIVER; issued Jul. 30, 1968 to F. W. Herr, et al. which features an ash receptacle with a clip for attaching the receptacle to a lawn chair or the like. For emptying, the Herr, et al. receptacle must be detached from the chair or other structure to which it has been clipped and then dumped. In contradistinction, the ash receptacle of the present invention features an ash receptacle for semi-permanent mounting on a golf cart or similar vehicle. Unlike Herr, et al., the inventive receptacle features an easily-removed insert which contains the collected ashes, butts, etc. The inventive ash receptacle also provides a hinged cover to keep rain or other precipitation from entering the ash-collection insert. The inventive ash receptacle also contains formed divots at its two front corners which firmly grip and hold a lighted cigarette or cigar.

Finally, U.S. Pat. No. 4,027,683 for DISPOSABLE ASH TRAY LINER AND MATING BOWL; issued Jun. 7, 1977 to L. Medley Lawbaugh, discloses a removable, disposable insert adapted to receive cigarette ashes or the like. The Lawbaugh insert is for a conventional ash tray such as would be used on a table top with the removable liner designed for discarding to avoid the necessity of cleaning the ash receptacle. In contradistinction, the removable ash-collecting insert of the present invention is non-disposable. The inventive ash receptacle is designed specifically for use with a golf cart or similar vehicle, not on a planar surface such as a table top. The inventive ash receptacle also provides a weather-proof, rotatable cover to keep rain or other precipitation out of the ash receptacle.

It is therefore an object of the invention to provide an ash receptacle for mounting on a vertical surface of a golf cart or similar vehicle intended for use out of doors.

It is a further object of the invention to provide a tiltable cover structure to keep rain out of the ash receptacle.

It is yet another object of the invention to provide a removable insert to contain the ashes and to facilitate the removal of the collected ashes and butts.

It is a still further object of the invention to provide a means for firmly and safely holding one or more lighted cigarettes.

It is an additional object of the invention to provide drainage and ventilation holes in the bottom region of the ash receptacle.

It is another object of the invention to provide an outer surface free from sharp corners to minimize the chance of injury to a person or a person's clothing.

It is still an additional object of the invention to assist in keeping the environment clean for future generations.

SUMMARY OF THE INVENTION

The present invention features an ash receptacle for attaching to a vertical surface of the body of a golf cart or similar vehicle. A tiltable cover keeps rain from entering the ash collection chamber which utilizes a removable insert for ease of dumping. Clips are provided for securely holding one or more lighted cigarettes. All outer edges and corners of the ash receptacle are rounded to prevent snagging a user's clothing or injuring a user in the event that the user accidentally brushes against or bumps the ash receptacle.

BRIEF DESCRIPTION OF THE DRAWINGS

A complete understanding of the present invention may be obtained by reference to the accompanying drawings, when taken in conjunction with the detail description thereof and in which:

FIG. 1 is a side view of the ash receptacle attached to a vertical surface but without the tiltable cover or insert;

FIG. 2a is side view of the ash receptacle showing the tiltable cover in a fully-closed position;

FIG. 2b is a side view of the ash receptacle with the tiltable cover opened approximately 45°;

FIG. 2c is a side view of the ash receptacle with the tiltable cover opened approximately 90°;

FIG. 2d is a side view of the ash receptacle with the tiltable cover fully opened, approximately 135°;

FIG. 2e is a side view of the ash receptacle with the tiltable cover fully opened, with the insert in place;

DESCRIPTION OF THE PREFERRED EMBODIMENT

Figure 3:
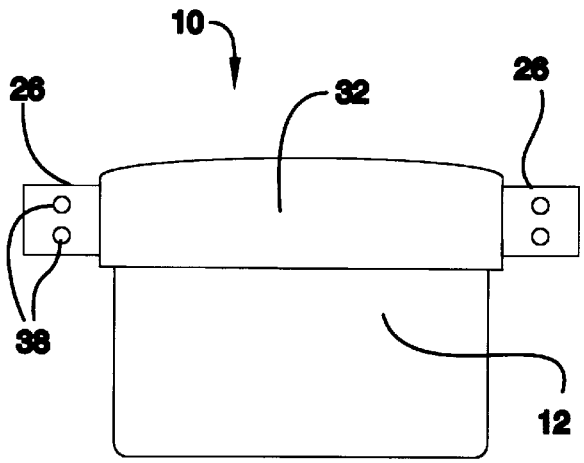
FIG. 3 is front view of the ash receptacle with the tiltable cover closed.

Generally speaking this invention relates to ash receptacles, and, more specifically, to ash receptacles for receiving cigarette ashes and butts use with golf carts or the like. Referring first to FIG. 1, there is shown a side view of the ash receptacle of the present invention, reference number 10. A main body portion 12 has a horizontal, open top surface 14 and a curved front surface 16. The rear surface 18 of body 12 is designed to rest against a vertical mounting surface 20 rear surface 18 being generally flat and vertically disposed when held against mounting surface 20, rear surface 18 being generally flat and vertically disposed when held against mounting surface 20. Vertical mounting surface 20 is assumed to be a body panel member of a golf cart or similar vehicle (not shown). Rear surface 18 of body 12 may be provided with an groove or other indentation 22 designed to accommodate a rib 24 or similar structural formation on surface 20. Optional drainage holes 31 may be incorporated in the lower region of body portion 12. Holes 31 allow any moisture such as rain or condensation within body portion 12 to be drained. Holes 31 are generally positioned at the lowest point in body portion 12. A mounting bracket 26 is provided for mounting body 12 to surface 20, generally by means of screws 28 or similar fasteners. Bracket 26 extends laterally from opposing sides body portion 12. It is anticipated that body portion 12 and bracket 26 are molded and that bracket 26 therefore forms an integral part of body portion 12. In alternate embodiments, bracket 26 may be attached to body portion 12 using any suitable means known to those skilled in the art. Ash receptacle 10 is adapted for mounting under a ledge 30 found on a typical golf cart. Ledge 30 is typically about 0.25 inches deep. The mounting position under ledge 30 helps contribute to the weatherproof design of the inventive ash receptacle 10. Body 12 may be fabricated from metal or an appropriate polymer, preferably by molding. Since lighted cigarettes or cigars will be in close proximity, choice of a material which poses no health or fire hazard if placed in contact with burning tobacco is important.

Referring now to FIGS. 2a and 2b, there is shown the ash receptacle 10 having rotatable cover 32 in place fully overlying removable insert 36. The shape of cover 32 is chosen to work cooperatively with the front surface 16 of body portion 12. The location of pivot point 34 is chosen so that cover 32 is free to rotate forward (i.e., away from vertical surface 18) thereby exposing top surface 14. In the preferred embodiment, cover 32 has pivot pins (not shown) rigidly attached to the inner surface of the cover at the pivot points. The pivot pins are cylindrical and are generally made from steel or stainless steel however, other suitable materials may be used. The pivot pins are received in mating holes (not shown) in each side of outer body portion 12. The holes may be provided with a polymer insert which provides a smooth bearing surface against the pivot pins. Hard nylon® or Teflon® have been found to be satisfactory materials from which to fabricate the inserts. It should be obvious that the pivot pins could be rigidly attached to the sides of body 12 and received in holes in the sides of cover 32 in alternate embodiments. Cover 32 is shown fully closed in FIG. 2a. In FIG. 2b, cover 32 is shown rotated approximately 45° counter-clockwise about pivot point 34. In FIGS. 2c and 2d, cover 32 is shown rotated approximately 90° and 135° respectively. At approximately 135°, cover 32 is essentially fully open exposing top surface 14 of body 12. Referring now to FIG. 2e, the fully open ash receptacle 10 is shown with removable insert 36 in place below the level of top surface 14 of removable insert 36, top surface 14 being entirely exposed from above when cover 32 is in the open position. Cover 32 may be formed from metal or from a suitable polymer able to resist heat generated by burning smoking material which may be present inside ash receptacle 10.

Referring now to FIG. 3, there is shown a front view of ash receptacle 10 with cover 32 in a closed position. Mounting holes 38 are shown in mounting brackets 26. It should be obvious that other hole patterns could be chosen to fit a particular mounting requirement.

Figure 4:
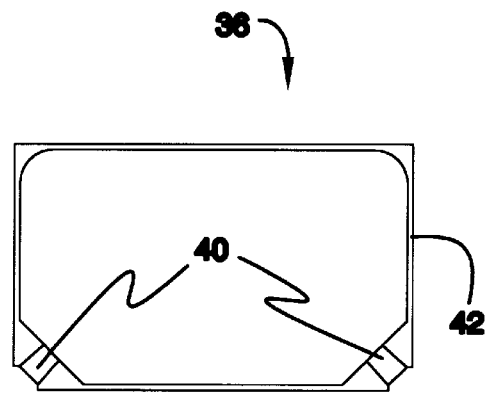
FIG. 4 is a top view of the insert.
Figure 5:
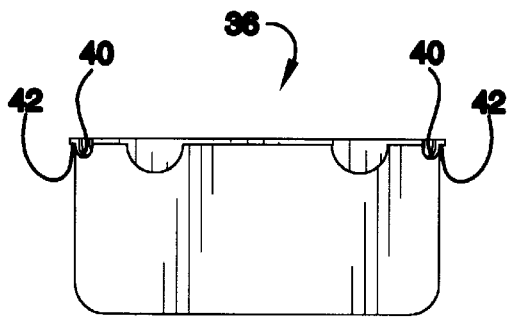
FIG. 5 is a front view of the insert.

Referring now to FIG. 4, there is shown a top view of removable insert 36. Recessed "divots" 40 are provided to accommodate burning cigarettes (not shown). A variety of cigarette holding mechanisms (not shown) well known to those skilled in the art could easily be adapted to work with the ash receptacle 10 of the present invention. Referring now also to FIG. 5, there is shown a front view of removable insert 36. A lip 42 is provided to allow removable insert 36 to sit on top of body 12 (FIG. 1) at surface 14. Removable insert 36 is a hollow, rectangular box structure made preferably of metal, or other suitable materials having the necessary fire proof characteristics. The overall dimensions of removable insert 36 are chosen so that insert 36 fits slidable into the interior portion of body 12 (FIG. 1) with lip 42 resting on top of body 12 at surface 14.

Figure 6:
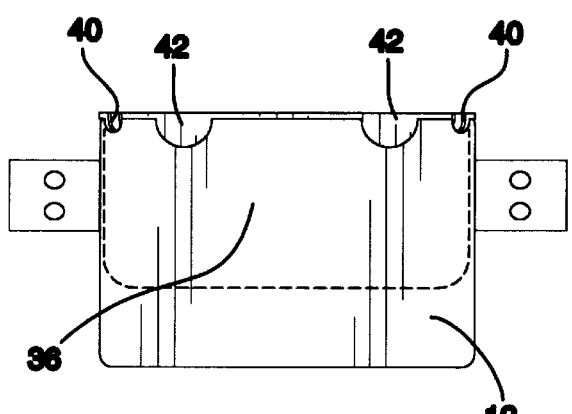
FIG. 6 is a front view of the ash receptacle with the cover open and the insert in place.

FIG. 6 shows that respective vertical peripheral walls of body 12 and insert 36 cooperate in close fit. This is also illustrated in FIG. 2E.

Since other modifications and changes varied to fit a particular operating requirements and environment will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent appended claims.

What is claimed is:

1. An ash receptacle for attachment to a golf cart, comprising;
    a hollow, outer body member having a generally flat rear surface and a curved front surface, said hollow outer body member being adapted for attachment to a golf cart, said outer body member also having a pair of vertical peripheral side walls extending between said generally flat rear surface and said curved front surface;
    a removable insert fitting inside said hollow outer body member, said insert having a lip sitting on top of said outer body member, said insert having a top surface for receiving ashes and a pair of insert vertical peripheral side walls dimensioned and configured to cooperate in close fit with both said outer body member vertical peripheral side walls;
    a cover rotably mounted to said outer body member at pivot points, said pivot points being located on said outer body member vertical peripheral side walls between said curved front surface and said generally flat rear surface, said cover being rotable between a first, closed position overlying said insert and a second position, whereby when said cover is in said first, closed position said cover covers said top surface of said removable insert and when said cover is in said second, open position, said cover is disposed entirely below said top surface of said removable insert and said top surface of said removable insert is accessible and entirely exposed from above for removal of said insert.

2. The ash receptacle as recited in claim 1, further comprising:

cylindrical pivot pins operatively attached to each side of said cover at said pivot points; and bearings in each side of said outer body assembly adapted to receive said pivot pins.

3. The ash receptacle as recited in claim 2, wherein said bearings comprise holes in said sides of said outer body assembly, said holes being adapted to receive said pivot pins and allow rotation of said pivot pins in said holes.

4. The ash receptacle as recited in claim 3, wherein said bearing holes further comprise polymer bushings in said holes, said polymer bushings being adapted to receive said pivot pins.

5. The ash receptacle as recited in claim 4 wherein said polymer bushings comprise nylon® bushings.

6. The ash receptacle as recited in claim 4 wherein said polymer bushings comprise Teflon® bushings.

7. The ash receptacle as recited in claim 1, further comprising:

means for holding at least one lighted cigarette, said means fixedly attached to said top surface of said removable insert, and said means for holding being proximate a front surface of said outer body member.

8. The ash receptacle as recited in claim 1, wherein said body further comprises an indented area located on said generally flat rear surface adapted to accommodate a rib of a golf cart.

9. The ash receptacle as recited in claim 1, wherein said outer body member is adapted for attachment to said golf cart by means of a mounting bracket rigidly attached to said outer body member, said bracket extending laterally from opposing sides of said outer body member.

10. The ash receptacle as recited in claim 9, wherein said mounting bracket is molded and comprises an integral part of said outer body member.

11. The ash receptacle as recited in claim 9, wherein said mounting bracket further comprises mounting holes for receiving a fastener.

12. The ash receptacle as recited in claim 1, wherein said cover and said removable insert and said outer body member cooperatively form a weather-proof ash receptacle.

13. The ash receptacle as recited in claim 1, wherein said out body member comprises edges and corners, said edges and corners being rounded.

14. The ash receptacle as recited in claim 1, further comprising:

a plurality of openings in a bottom region of said outer body member whereby any trapped liquid may escape from the interior of said hollow outer body member.

* * * * *